(12) United States Patent  
Hancock et al.

(10) Patent No.: US 12,420,771 B2  
(45) Date of Patent: Sep. 23, 2025

(54) APPARATUS AND METHOD FOR CONTROLLING AN ELECTRIC MACHINE

(71) Applicant: JAGUAR LAND ROVER LIMITED, Coventry (GB)

(72) Inventors: Matthew Hancock, Rugby (GB); Gareth Jones, Warwick (GB); Christina O'Sullivan, Coventry (GB); Ratheev Kumari Nair, Coventry (GB)

(73) Assignee: JAGUAR LAND ROVER LIMITED, Whitley (GB)

( * ) Notice: Subject to any disclaimer, the term of this patent is extended or adjusted under 35 U.S.C. 154(b) by 233 days.

(21) Appl. No.: 17/920,747

(22) PCT Filed: Apr. 21, 2021

(86) PCT No.: PCT/EP2021/060397  
§ 371 (c)(1),  
(2) Date: Oct. 21, 2022

(87) PCT Pub. No.: WO2021/214140  
PCT Pub. Date: Oct. 28, 2021

(65) Prior Publication Data  
US 2023/0166712 A1    Jun. 1, 2023

(30) Foreign Application Priority Data

Apr. 21, 2020    (GB) ..................... 2005815

(51) Int. Cl.  
*B60W 20/10*    (2016.01)  
*B60K 6/26*    (2007.10)  
(Continued)

(52) U.S. Cl.  
CPC .............. *B60W 20/10* (2013.01); *B60K 6/26* (2013.01); *B60K 6/485* (2013.01); *B60W 10/06* (2013.01);  
(Continued)

(58) Field of Classification Search  
CPC ...... B60W 20/10; B60W 10/06; B60W 10/08; B60W 30/1843; B60W 30/188;  
(Continued)

(56) References Cited

U.S. PATENT DOCUMENTS 10,029,695 B1    7/2018    Gibson et al.  
2015/0008889 A1*    1/2015    Hayashi ............... B60W 20/00  
    322/24  
2019/0184966 A1    6/2019    Crisp et al.

FOREIGN PATENT DOCUMENTS

DE    102019117773 A1    3/2020  
JP    2017020361 A    1/2017  
(Continued)

OTHER PUBLICATIONS

Machine translation of Japanese Patent Publication-2020037332-A (corresponds to Japanese Application No. JP 2018165401) (Year: 2020).*

(Continued)

*Primary Examiner* — Alan D Hutchinson  
(74) *Attorney, Agent, or Firm* — Troutman Pepper Locke LLP; Dustin B. Weeks; Nicholas H. Doss (57) ABSTRACT

Embodiments of the present invention provide a control system (200) for an electric machine (120) of a vehicle, the control system comprising one or more controllers, the control system comprising input means (230) to receive a torque communication signal (255) indicative of torque communication through a belt (130) associated with the electric machine, processing means (210) arranged to determine a torque limit for the electric machine in dependence on the torque communication signal and a first torque threshold, and output means (240) arranged to output a torque limit signal (245) in dependence on the torque limit (Continued)

to control the torque communicated through the belt associated with the electric machine.

18 Claims, 4 Drawing Sheets

(51) Int. Cl.
*B60K 6/485* (2007.10)
*B60W 10/06* (2006.01)
*B60W 10/08* (2006.01)
*B60W 30/184* (2012.01)
*B60W 30/188* (2012.01)

(52) U.S. Cl.
CPC ........ *B60W 10/08* (2013.01); *B60W 30/1843* (2013.01); *B60W 30/188* (2013.01); *B60W 2510/083* (2013.01); *B60W 2510/087* (2013.01); *B60W 2710/083* (2013.01)

(58) Field of Classification Search
CPC ..... B60W 2510/083; B60W 2510/087; B60W 2710/083; B60W 2510/081; B60W 2510/085; B60W 2520/10; B60W 2710/029; B60W 2710/086; B60W 30/184; B60W 30/1846; B60W 30/186; B60K 6/26; B60K 6/485; B60K 2006/268; Y02T 10/62; F02B 67/06
See application file for complete search history.

(56) References Cited

FOREIGN PATENT DOCUMENTS

| JP | 2017129013 A | 7/2017 | |
|---|---|---|---|
| JP | 2020037332 A * | 3/2020 | ............ B60K 6/387 |
| WO | 02075914 A1 | 9/2002 | |

OTHER PUBLICATIONS

PCT International Search Report for International Application No. PCT/EP2021/060397, Jun. 22, 2021, 3 pages.

Written Opinion of the International Searching Authority for International Application No. PCT/EP2021/060397, Jun. 22, 2021, 6 pages.

Combined Search and Examination Report for application GB2005815.2, Sep. 17, 2020, 6 pages.

Patents Act 1977: Examination Report under Section 18(3) for application GB2005815.2, Jul. 20, 2022, 4 pages.

* cited by examiner

APPARATUS AND METHOD FOR CONTROLLING AN ELECTRIC MACHINE

TECHNICAL FIELD

The present disclosure relates to controlling an electric machine and particularly, but not exclusively, to controlling an electric machine associated with a belt. Aspects of the invention relate to a control system, to a powertrain, to a vehicle, to a method, and to computer software.

BACKGROUND

It is known for a powertrain of a hybrid vehicle to utilise an electric machine coupled to an internal combustion engine via flexible belt, such as made of rubber or the like. The belt may be shaped and/or have features to enable better communication of torque, such as to reduce belt slippage. For example the belt may have a V- or wedge-shaped contact surface and/or have ribs for contacting pulleys with which the belt engages. The electric machine and belt may form part of a front end auxiliary drive (FEAD) of the vehicle. The electric machine may be used as a generator, to generate electricity from rotation provided by the engine, or to assist the engine during starting and in providing motive force for the vehicle. The architecture may be referred to as a belt-integrated starter generator (BiSG). Such arrangements may be used in vehicles referred to as a mild-hybrid electric vehicle (MHEV) or a plug-in hybrid vehicle (PHEV), for example. However the belt may be required to be changed regularly to aid reliability.

It is an object of embodiments of the invention to at least mitigate one or more of the problems of the prior art.

SUMMARY OF THE INVENTION

Aspects and embodiments of the invention provide a control system, a powertrain for a vehicle, a vehicle, a method and computer software as claimed in the appended claims.

According to an aspect of the invention, there is provided a control system for an electric machine of a vehicle, the control system comprising one or more controllers, the control system comprising input means to receive a torque communication signal indicative of torque communication through a belt associated with the electric machine, processing means arranged to determine a torque limit for the electric machine in dependence on the torque communication signal, and output means arranged to control the torque communicated through the belt associated with the electric machine in dependence on the torque limit. Advantageously the torque limit is determined in dependence on torque communicated through the belt. The torque limit may thus dynamically vary according to the torque communicated.

According to an aspect of the invention, there is provided a control system for an electric machine of a vehicle, the control system comprising one or more controllers, the control system comprising input means to receive a torque communication signal indicative of torque communication through a belt associated with the electric machine, processing means arranged to determine a torque limit for the electric machine in dependence on the torque communication signal and a first torque threshold, and output means arranged to output a torque limit signal in dependence on the torque limit to control the torque communicated through the belt associated with the electric machine. Advantageously the torque limit is determined in dependence on torque communicated through the belt and the first torque threshold. The torque limit may thus dynamically vary according to the torque communicated relative to the first torque threshold.

The torque communication signal may be indicative of a torque request. Advantageously the torque limit may be determined in dependence on the requested torque communicated through the belt. The torque communication signal may be indicative of torque generated by the electric machine. Advantageously the torque limit may be determined in dependence on torque physically communicated through the belt by the electric machine.

Optionally the torque communication signal may be indicative of power or torque. Advantageously different metrics may be indicated by the torque communication signal.

The processing means is optionally arranged to reduce the torque limit in dependence on the torque communication signal exceeding the first torque threshold. Advantageously the torque limit is reduced in response to torque exceeding the first torque threshold.

The processing means may be arranged to increase the torque limit in dependence on the torque communication signal being less than the first torque threshold. Advantageously, greater torque may be communicated through the belt when the torque communication signal is less than the first toque threshold.

The processing means may be arranged to determine an integral of the torque communication signal with respect to the first torque threshold. Advantageously the integral is indicative of a volume of torque communicated over time by the belt.

Optionally the processing means may determine the torque limit in dependence on the integral of the torque communication signal. Advantageously the torque limit is dynamically determined according to the integral In some examples, the processing means is arranged to update a monitor value in dependence on the torque communication signal. The monitor value may advantageously track the torque communication signal. The torque limit is optionally determined in dependence on the monitor value.

In some examples, the processing means is arranged to update a monitor value in dependence on the integral of the torque communication signal. The monitor value may advantageously track the integral of the torque communication signal. The torque limit is optionally determined in dependence on the monitor value.

The processing means may be arranged to control the torque limit in dependence on the monitor value and a monitor value threshold. Advantageously the torque limit is controlled in dependence on the monitor value relative to the monitor value threshold. Optionally the monitor value threshold has a value of zero.

The processing means is optionally arranged to increase the monitor value in dependence on the torque communication signal exceeding the first torque threshold. Advantageously increasing the monitor value may be indicative of heating of the belt.

The processing means is optionally arranged to decrease the monitor value in dependence on the torque communication signal being less than the first torque threshold. Advantageously decreasing the monitor value may be indicative of cooling of the belt.

Optionally the processing means is arrange to increase the monitor value at a different rate than decrease. Advantageously different rates of heating and cooling of the belt may be represented. For example, the belt may be determined to cool more quickly than heat.

The processing means is optionally arranged to increase the monitor value at a first rate and to decrease the monitor value at a second rate. Advantageously the first and second rates may independently represent heating and cooling. The monitor value may be increased or decreased sequentially or non-sequentially. Optionally the first rate is different from the second rate.

The processing means may be arranged to update the monitor value in dependence on the torque communication signal being equal to the first torque threshold. Advantageously the monitor value represents torque communication substantially at or equal to the first torque threshold.

The processing means is optionally arranged to control the output means to output a gradually changing torque limit signal when the torque communication signal is indicative of a greater torque than the torque limit. Advantageously the gradually changing torque limit signal aids control which is less perceptible to users of the vehicle.

The torque communication signal may be a torque request signal indicative of a request for torque from the electric machine. The torque limit signal may be a modified torque request signal. Advantageously the request for torque is modified to control torque communication.

The first torque threshold is indicative of a temperature threshold for the belt associated with the electric machine. Advantageously a temperature of the belt is controlled, which may aid longevity of the belt.

The input means is arranged to receive an ambient temperature signal and the processing means is arranged to determine the torque limit in dependence on the ambient temperature signal. Advantageously torque communication is controlled in dependence on the ambient temperature. For example, in hot climates torque communication is controlled accordingly.

Optionally the input means is arranged to receive a cooling signal indicative of cooling of, or around, the electric machine and the processing means is arranged to determine the torque threshold limit in dependence on the cooling signal. Advantageously the cooling of, or around, the electric machine, which may cool the belt, is considered in controlling the torque communication.

The processing means may be arranged to dynamically determine the torque limit for the electric machine in dependence on the torque communication signal and to control the output means to output the torque limit signal in dependence on the dynamically determined torque limit. Advantageously a fixed torque limit is avoided and the torque limit dynamically varies which may allow, at least for periods of time, an increase in torque communication through the belt.

According to another aspect of the present invention, there is provided a powertrain for a vehicle comprising the control system as described above.

According to a further aspect of the present invention, there is provided a vehicle comprising the control system as described above.

According to a still further aspect of the present invention, there is provided a method of controlling an electric machine of a vehicle, comprising receiving a torque communication signal indicative of torque communication through a belt associated with the electric machine, determining a torque limit for the electric machine in dependence on the torque communication signal and a first torque threshold, and controlling the torque communicated through the belt associated with the electric machine in dependence on the torque limit.

The determining the torque limit may comprise reducing the torque limit in dependence on the torque communication signal exceeding the first torque threshold.

The determining the torque limit may comprise increasing the torque limit in dependence on the torque communication signal being less than the first torque threshold.

The determining the torque limit optionally comprises determining an integral of the torque communication signal with respect to the first torque threshold, and determining the torque limit in dependence on the integral of the torque communication signal.

The method may comprise updating a monitor value in dependence on the integral of the torque communication signal, wherein the torque limit is determined in dependence on the monitor value.

The method optionally comprises controlling the torque limit in dependence on the monitor value and a monitor value threshold.

The method may comprise increasing or decreasing the monitor value in dependence on the torque communication signal respectively exceeding or being less than the first torque threshold.

According to a yet further aspect of the present invention, there is provided computer software which, when executed by a computer, is arranged to perform a method as described above.

Any controller, controllers or control module described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller", "control unit" or "control module" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
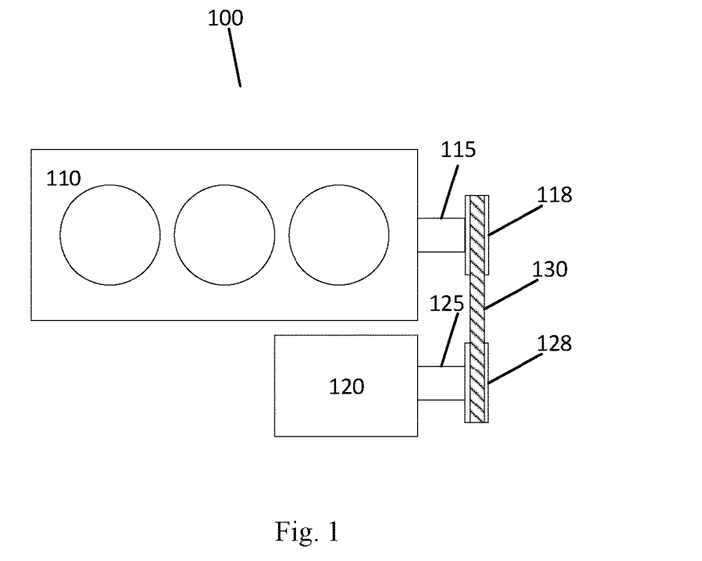
FIG. 1 shows a system according to an embodiment of the present invention.

FIG. 1 illustrates a system 100 comprising an electric machine 120, according to an embodiment of the invention, which communicates torque via an associated belt 130. In the illustrated embodiment the electric machine 120 is coupled, via the belt 130, to an internal combustion engine (ICE) 110. The belt 130 couples an output shaft 125 of the electric machine 120 to a crankshaft 115 of the ICE 110. The belt 130 is a flexible belt and is arranged around a pulley 118, 128 associated with the shaft 115, 125 of each of the electric machine 120 and the ICE 110.

FIG. 1 shows the electric machine 120 being directly coupled to the ICE 130, although it will be appreciated that other components may also be coupled via the same belt 130, or via other belts, around pulleys associated with the crankshaft and/or the electric machine 120.

The electric machine 120 is arranged to provide torque to the ICE 130. The electric machine 120 may be used to start i.e. to crank the ICE 130. The electric machine 120 may provide motive torque via the ICE 130 i.e. the electric machine 120 and the ICE 130 may act as a hybrid power unit for a vehicle. The electric machine 120 may also act as a generator wherein torque from the ICE 110 is used to rotate the shaft 125 of the electric machine 120. Thus, in some embodiments, the electric machine may be a belt-integrated starter generator (BiSG).

Figure 2:
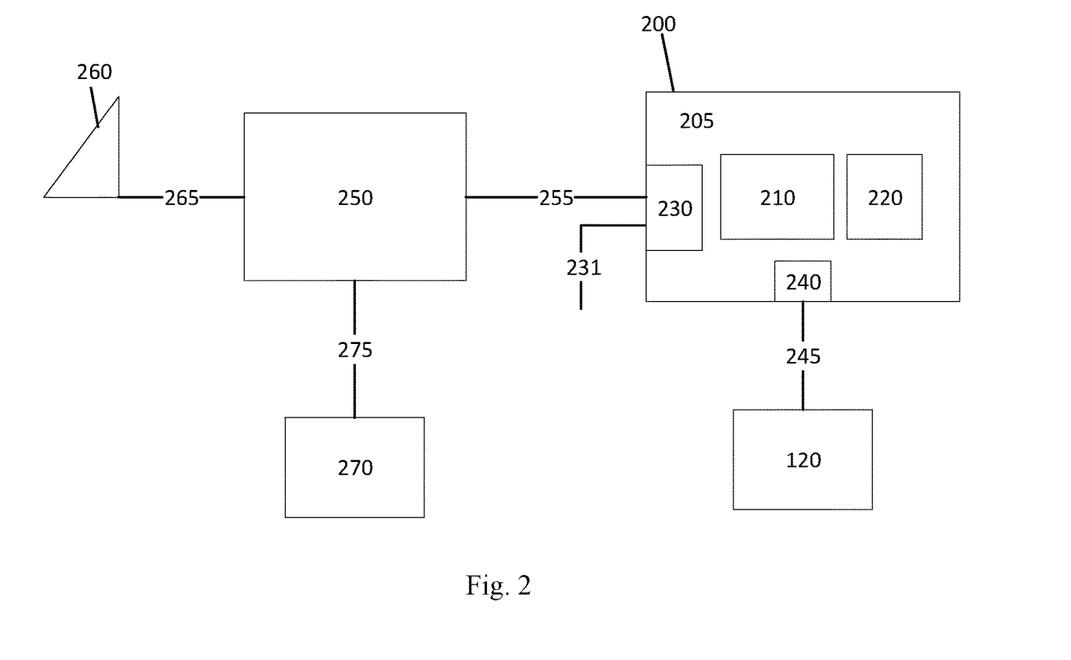
FIG. 2 shows a control system according to an embodiment of the present invention.

FIG. 2 illustrates a control system 200 according to an embodiment of the invention. The control system 200 may be formed by one or more electronic controllers. The control system 200 illustrated in FIG. 2 comprises one controller 205 although it will be appreciated that this is merely illustrative. The, or each, controller 205, comprises a processing means 210 and a memory means 220. The processing means 210 may be one or more electronic processing devices, such as CPUs, for executing computer readable instructions. The memory means 220 may be one or more memory devices 220. The one or more memory devices may store computer-readable instructions for execution by the one or more processing devices 210.

The controller 205 comprises an input means 230 and an output means 240. The input means 230 is arranged to receive one or more signals 255, 231. The input means 230 may be an electrical input to the controller 205 for receiving one or more electrical signals 255, 231. The output means 240 is arranged to output at least one signal 245, which is provided in FIG. 2 to the electric machine 120. The output means 240 is an electrical output of the controller 205. The output means 240 is operable by the processing means 210 to output the signal 245 under control thereof.

The electrical input 230 and output 240 of the controller 205 may be provided to/from a communication bus or network of the vehicle, such as a CANBus or other communication network which may, for example, be implemented by an Internet Protocol (IP) based network such as Ethernet, or FlexRay or a Single Edge Nibble Transmission (SENT) protocol, although protocols may be used.

The input means 230 is arranged to receive a torque communication signal 255 which is indicative of torque communication through the belt 130 associated with the electric machine 120. The torque communication signal 255 may be indicative of power communicated through the belt 130 or a speed of the belt 130 in some embodiments, with it being appreciated that torque, power and speed of the belt are related. The torque communication signal 255 may be indicative of one or more measurements or estimations of torque communicated through the belt 130. In some embodiments the torque communication signal 255 is indicative of a torque request for the electric machine 120, this being a torque request signal 255. The output means 240 is arranged to output a torque limit signal 245 to control the torque communicated through the belt 130 associated with the electric machine 120, as will be explained. In some embodiments, the torque limit signal 245 is a modified torque request signal 245 i.e. a version of the torque request signal 255 which, at some points in time, may be modified from the torque request signal 255 received by the controller 205.

The torque communication signal 255 may be received from a powertrain controller 250 which is arranged to control, at least partly, a powertrain of the vehicle. The powertrain controller 250 is arranged to receive one or both of a driver-input torque request 265 such as in the form of a throttle position signal 265 from a throttle or accelerator control 260 i.e. a throttle or accelerator pedal, associated with the vehicle, and a torque request signal 275 from an advanced driver assistance system (ADAS) 270 such as a cruise control, adaptive cruise control, or autonomous driving system of the vehicle. The throttle position signal 265 is indicative of a driver-input torque request for the powertrain, whereas the torque request signal 275 from the ADAS is indicative of an ADAS generated torque request 275. The powertrain controller 250 is arranged to generate the torque communication signal 255 in dependence on one or both of the driver-input torque request 265 and the ADAS generated torque request 275. Thus the torque communication signal 255 in some embodiments represents a request for torque from the electric machine 120. The torque communication signal 255 may, in some embodiments, represents a combined request for torque from the ICE 110 and the electric machine 120. It will also be appreciated that the torque request signal 255 may be a request for torque when the electric machine 120 is operative as a generator such as to charge one or more batteries of the vehicle.

It has been appreciated that communication of torque associated with the electric machine 120 via the belt 130 may, in some circumstances, be detrimental to the belt 130. As a result of torque communication via the belt 130 a temperature of the belt 130 may increase, which has been observed to cause accelerated wear of the belt 130 and/or a reduced time to failure of the belt 130. Operating the electric machine 120 at torque outputs which do not cause excessive heating of the belt 130 may limit usefulness of the electric machine 120. For example, the usefulness may be limited when the torque output of the electric machine 120 is limited to a fixed torque value.

In embodiments of the invention, the processing means 210 is arranged to determine a torque limit for the electric machine 120. The torque limit is determined by controller 205 to control the temperature of the belt 130, which may advantageously reduce excessive wear of the belt 130. In embodiments of the invention the torque limit is determined by the controller 205 in dependence on the torque communication signal 255. The torque limit is determined by the processing means 210 of the controller 205. The torque limit may be dynamically determined to control the wear of the belt 130.

In embodiments of the invention, the torque limit is determined by the controller 205 in dependence on a first torque threshold. The first torque threshold is indicative of a temperature threshold for the belt 130 associated with the electric machine 120. The first torque threshold may represent a torque which is communicable by the belt 130 to/from the electric machine 120 whilst maintaining the temperature of the belt 130 at a temperature which is suitable for substantially continuous operation. In some embodiments, the belt 130 may be determined to be operable for extended periods of time, such as greater than 5 minutes or up to, for example, 30 minutes at a generally constant operation temperature which may be up to, for example, 150° C. without excessive wear or loss of durability to the belt 130 occurring. The first torque threshold is the torque communicable by the belt 130 at thermal equilibrium where the temperature of the belt 130 does not rise above the constant operation temperature. Thus the first torque threshold may be a thermal equilibrium torque threshold. In some embodiments, the first torque threshold may correspond to a communicated power through the belt of 15 kW with it being appreciated that this is merely an example power.

In embodiments of the invention, the torque limit is determined by the controller 205 in dependence on a second torque threshold. The second toque threshold is indicative of a maximum torque threshold for the belt 130 associated with the electric machine 120. The second torque threshold may represent a maximum torque which is communicable by the belt 130 to/from the electric machine 120.

The torque limit is determined by the controller 205 to dynamically vary between the thermal equilibrium torque threshold and the maximum torque threshold. In this way, the torque communicated by the electric machine 120 may vary between that which the belt 130 may communicate substantially continuously without excessive heating of the belt 130 and the maximum torque communicable by the belt 130, without the torque communicable via the belt 130 being continuously limited to the thermal equilibrium torque threshold. In some embodiments, the second torque threshold may correspond to a communicated power through the belt of 35 kW with it being appreciated that this is merely an example power.

The processing means 210 is arranged to determine the torque limit in dependence on the torque communication signal 255 with respect to the first torque threshold. In particular, in embodiments of the invention, the torque limit is determined in dependence on a magnitude of the torque communication signal 255 with respect to the first torque threshold, as will be explained.

In some embodiments, the input means 230 of the controller 205 is arranged to receive a vehicle attribute signal 231 indicative of one or more vehicle attributes. The vehicle attribute signal may be provided from other module(s) of the vehicle. In some embodiments, at least some of the one or more vehicle attributes relate to a cooling of the vehicle and, in particular, vehicle attributes may which influence the temperature of the belt 130. In some embodiments, the vehicle attribute signal 231 is indicative a speed of the vehicle. The speed of the vehicle may influence airflow proximal to the belt 130 which may aid in cooling the belt 130. In some embodiments, the vehicle attribute signal 231 is indicative of a state of one or more cooling control means of the vehicle. The cooling control means may comprise a state of one or more vanes, flaps or other means to direct airflow which are arranged to influence cooling of the belt 130. The cooling control means may comprise a speed of one or more fans which are arranged to assist airflow in cooling the belt 130. In some embodiments, the vehicle attribute signal 231 is used by the processing means 210 in determining the torque limit.

Figure 3:
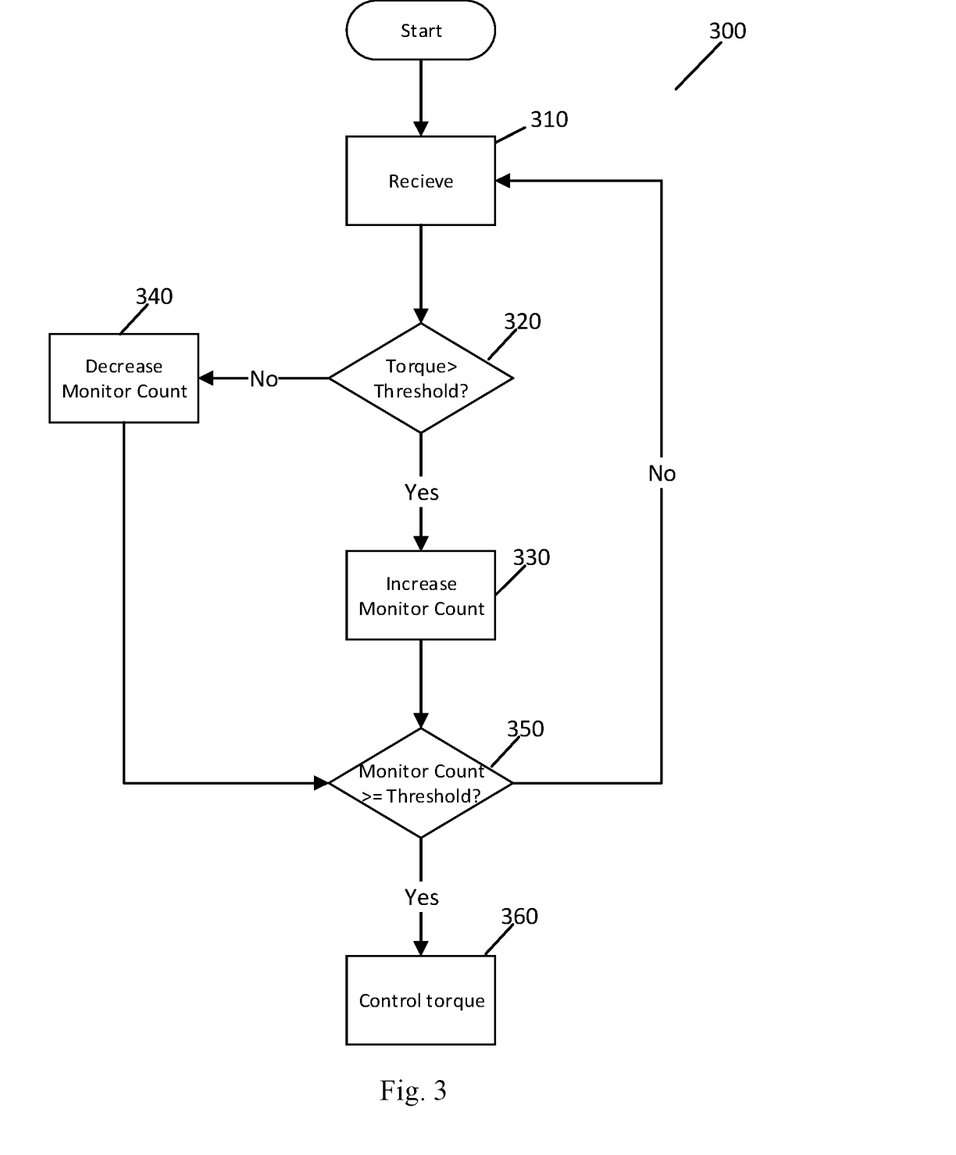
FIG. 3 shows a method according to an embodiment of the present invention.

A method 300 according to an embodiment of the invention will now be explained with respect to FIGS. 3 and 4. The method 300 may be performed by the processing means 210. The method 300 is a method of controlling torque communication through the belt 130 associated with the electric machine 120. Computer executable instructions representing the method 300 may be stored in the memory 220.

The method 300 comprises a step 310 of receiving the torque communication signal 255. The torque communication signal 255 is received at the controller 205 i.e. via the input 230. The torque communication signal 255 is, in some embodiments, indicative of a request for torque to be communicated via the belt 130 to/from the electric machine 120. In some embodiments, the torque communication signal 255 may be indicative of a request for torque to be provided from the electric machine 120 responsive to a demand for torque from the driver i.e. via control 260, or the ADAS system 270 of the vehicle. In other embodiments, the torque communication signal 255 may be indicative of torque being communicated via the belt 130 such as derived from measurements or calculations, for example.

Figure 4:
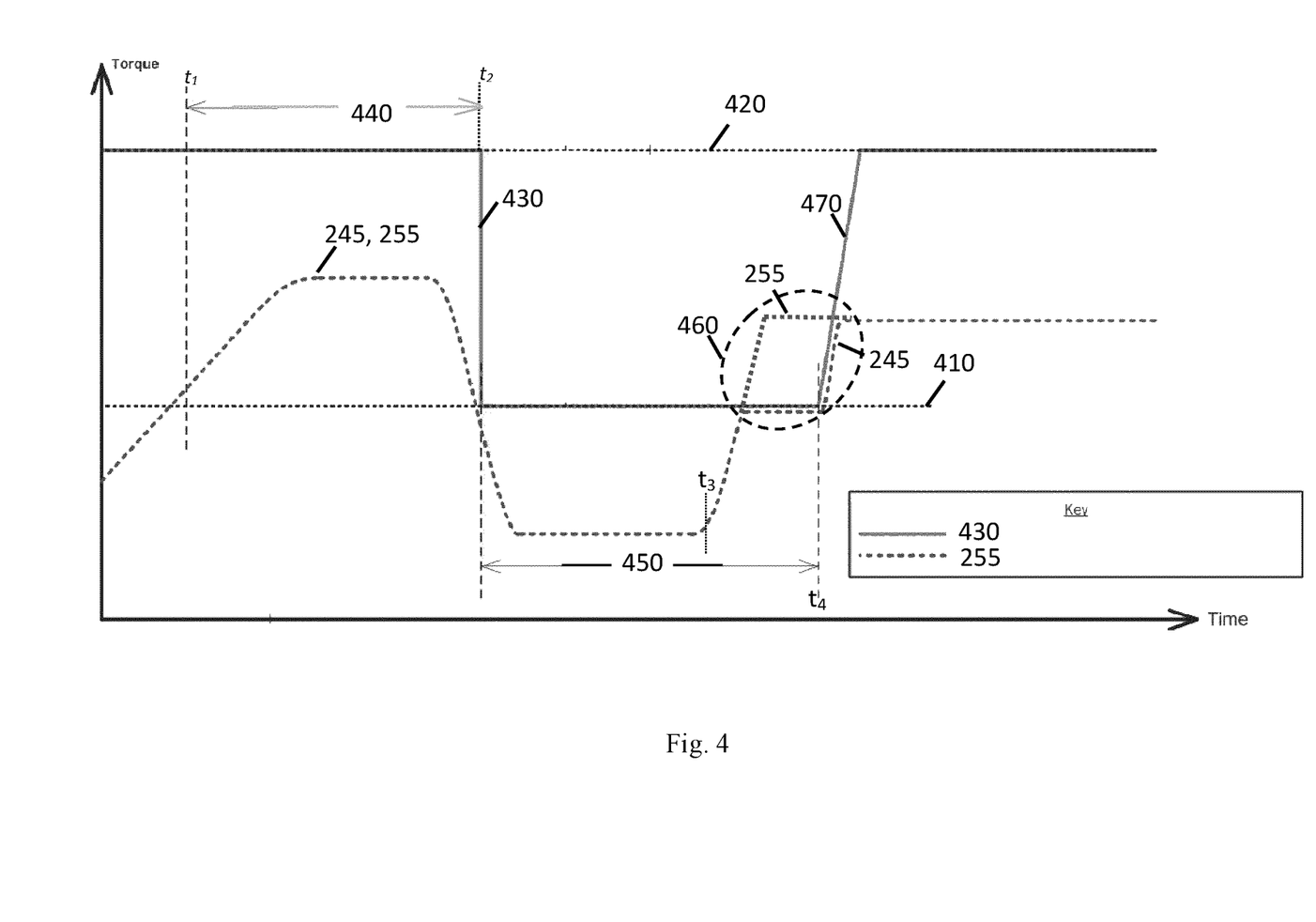
FIG. 4 illustrates a torque limit according to an embodiment of the invention.

FIG. 4 illustrates the torque communication signal 255 in an example over a period of time. FIG. 4 also illustrates the first torque threshold 410 which represents the thermal equilibrium torque threshold 410 and the second torque threshold 420 which represents the maximum torque threshold 420, which is greater than the thermal equilibrium torque threshold 410. As can be appreciated, in the illustrated example the torque communication signal 255 is indicative of a torque request which varies over time in the illustrated example between less than the thermal equilibrium torque threshold 410 to greater than the thermal equilibrium torque threshold 410.

FIG. 4 also illustrates the torque limit 430 in the example over the period of time. As can be appreciated, the torque limit 430 corresponds, at some periods in time, to the maximum torque threshold 420 and, at other periods in time, to the first torque threshold 410 representing the thermal equilibrium torque threshold 410. At other points in time the torque limit adopts values between the two thresholds 410, 420. When the torque limit 430 is greater than the torque communication signal 255 then no constraint is imposed on the torque communication signal 255 i.e. where the torque communication signal 255 is a torque request no limitation is imposed on the received torque request. That is, the modified torque request signal 245 corresponds to (is equal to) the torque communication signal 255. However, at other times, the torque limit 430 is determined for limiting the torque request indicated by the torque communication signal 255, as will be explained. In the example, the torque limit 430 is determined to limit the torque request 255 in the region indicated by 460. Thus in the region 460 the modified torque request signal 245 deviates from the received torque request 255. In FIG. 4 in the region 460 the modified torque request 245 is less than the received torque request 255 owing to the determined torque limit 430 as will be explained. Although not shown in FIG. 4, in some embodiments, a torque output from the ICE 120 may be controlled in dependence on the modified torque request 245. In one example, where the electric machine is being used as generator against the ICE 120, a reduction in torque to the electric machine 120 without a corresponding reduction in torque output from the ICE 120 would lead to acceleration of the vehicle. Thus in some situations the torque output of the ICE 120 may be reduced corresponding to the electric machine 120. In another example, where the torque output from the electric machine 120 is reduced when providing motive torque to assist the ICE 120, since it is desired for the reduction in electric machine torque not to be noticeable to occupants of the vehicle, in particular a driver of the vehicle, a torque request to the ICE 100 may be increased corresponding to the reduction of torque from the electric machine 120.

In a step 320 of the method 300 it is determined whether the torque communication signal 255 is indicative of torque which is greater than the first torque threshold 410. Thus step 320 comprises a comparison between the requested torque, as indicated by the torque communication signal 255, and the torque represented by the first torque threshold 410.

FIG. 4 illustrates the torque communication signal 255 varying over a period of time. Illustrated in FIG. 4 are the first torque threshold 410 which, as discussed above, may correspond to a thermal equilibrium torque threshold 410, and a maximum torque threshold 420. The first torque threshold 410 may correspond to 20 Nm, although it will be realised that this is merely an example and other torque values may be used. The maximum torque threshold 420 corresponds to a maximum torque communicable by the belt 130. For example, the maximum torque threshold may correspond to 35 Nm although it will be realised that this is merely an example and other torque values may be used.

The torque communication signal 255 rises to exceed the first torque threshold 410 at time $t_1$, as determined in step 320. Thus, when step 320 is performed between $t_1$ and $t_2$ in FIG. 3 the method moves to step 330. If, however, the torque communication signal 255 is indicative of a torque which is less than the first torque threshold 410 the method moves to step 340. In some embodiments, as will be explained, the method 300 may move to step 340 when the torque communication signal 255 equals the first torque threshold 410.

In some embodiments of the invention, data indicative of a maximum period of time 440 for which the torque communication signal 255 is permissible over the first torque threshold 410 is stored in the memory 220. The maximum period 440 is illustrated in FIG. 4. In some embodiments, the torque limit 430 is determined by the controller 205 in dependence on the maximum period of time 440. In particular, the controller 205 is arranged to determine the torque limit 430 to reduce torque communicated through the belt 130 when the torque communication signal 255 exceeds the first torque threshold 410 for a period of time which equals the maximum period 440.

In embodiments of the invention, the processing means 210 of the controller 205 is arranged to reduce the torque limit 430 in dependence on the torque communication signal 255 exceeding the first torque threshold 410, as will be explained. Similarly, in some embodiments, the processing means 210 of the controller 205 is arranged to increase the torque limit 430 in dependence on the torque communication signal 255 being less than the first torque threshold 410.

In some embodiments of the invention, data indicative of a recovery period 450 of time for which the torque communication signal 255 is required to be below the first torque threshold 410 is stored in the memory means 220. The recovery period 450 is illustrated in FIG. 4. In some embodiments, the torque limit 430 is determined by the controller 205 in dependence on the recovery period 450. In particular, the controller 205 is arranged to determine the torque limit 430 to allow an increase in torque communicated through the belt 130 when the torque communication signal 255 has been less than the first torque threshold 410 for a period of time which equals the recovery period 450.

In some embodiments, the processing means 210 of the controller 205 is arranged to determine an integral of the torque communication signal 255 with respect to the first torque threshold 410. That is, the processing means 210 is arranged to integrate the torque communication signal 255 with respect to the first torque threshold 410 to determine an area between the torque communication signal 255 and the first torque threshold 410. In this way, the processing means 210 is arranged to determine a value indicative of a magnitude and period of time for which the torque communication signal 255 exceeds and/or is less than the first torque threshold 410. For example, in some embodiments, if the torque communication signal exceeds the first torque threshold 410 by 10 Nm for 2 seconds, the value determined may be 10×2=20 i.e. the value may be determined to be unitless in some embodiments. Similarly, if the torque communication signal exceeds the first torque threshold 410 by 20 Nm for 1 second the value may also be determined to be 20. The processing means 210 of the controller 205 is arranged to determine the torque limit 430 in dependence on the integral of the torque communication signal 255 as will be explained.

In some embodiments, the processing means 210 of the controller 205 is arranged to determine a monitor count (MC) or monitor value indicative of a relationship between the torque communication signal 255 and the first torque threshold 410. In steps 340, 350 the monitor value is updated to dynamically track the relationship between the torque communication signal 255 and the first torque threshold 410, as will be explained.

The processing means 210 of the controller 205 may periodically, such as every 0.1, 0.5, 1 second or 5 seconds, for example, update the monitor value in dependence on an integral of the integral of the torque communication signal 255 with respect to the first torque threshold 410 during the preceding interval. For example, in the above described example the processing means may increase a value of the monitor value reflecting that the torque communication signal 255 was above the first torque threshold 410. Conversely, if the torque communication signal 255 was less than the first torque threshold 410, the processing means 210 is arranged to decrease a value of the monitor value. Thus the monitor value maintains a running, cumulative, indication of the relationship between the torque communication signal 255 and the first torque threshold 410. The processing means 210 of the controller 205 is arranged to update the monitor value in dependence on the integral of the torque communication signal 255 as explained above. In step 340 the monitor value is decreased whereas in step 330 the monitor value is increased.

Where it is described that the processing means 210 increases or decreases the monitor value it will be appreciated that the processing means 210 may alternatively decease or increase the monitor value, respectively. Increasing the monitor value may be indicative of a risk of the belt 130 heating whilst decreasing the monitor value may be indicative of the belt 130 cooling. In some embodiments, the processing means 210 initialises the monitor value to a predetermined value when the method 300 starts.

In step 350 it is determined whether the monitor value is greater than or equal to a monitor count or monitor value threshold. The torque limit 430 is determined by the processing means 210 in dependence on the monitor value. In particular, the processing means 210 is arranged to control the torque limit 430 in dependence on the monitor value and the monitor value threshold. One or both of the monitor value threshold and an initialisation value of the monitor value is indicative of a maximum cumulative amount by which the torque communication signal 255 can cumulatively exceed the first torque threshold 410 before the torque limit 430 is imposed to control torque communication through the belt 130. In some embodiment, the monitor value threshold is zero and the initialisation value of the monitor value is used to control the torque communication. Thus the torque communication is controlled by a difference between the initialisation value and the monitor value threshold.

In some embodiments, the processing means 210 is arranged to increase the monitor value at a different rate than decrease the monitor value. Said different rates may be indicative of different rates of heating and cooling of the belt 130. For example, where the belt 130 is believed to cool more quickly than to heat in response to torque being below and above the first torque threshold 410 indicative of thermal equilibrium, respectively, in some embodiments, a rate of one or both of increase and decrease may be determined in dependence on the vehicle attribute signal 231. In particular, a rate of decrease, reflecting belt cooling, of the monitor value may be determined in dependence on vehicle attributes likely to cause an increase in cooling of the belt 130 i.e. the monitor value may be decreased more quickly in the presence of increased cooling, such as the vehicle attribute signal 231 indicating an opening of cooling vanes of the vehicle. In some embodiments, the processing means 210 is arranged to increase the monitor value at a first rate and to decrease the monitor value at a second rate, wherein the first rate is different from the second rate. For example, the first rate may be a multiplier of 1.5 applied to the unitless value determined as explained above, whereas the second rate may be a multiplier of 1 with it being appreciated that these rates are merely examples.

In some embodiments, the processing means 210 is arranged to update the monitor value in dependence on the torque communication signal 255 being equal to the first torque threshold 410. As discussed above, in some embodiments the first torque threshold 410 is indicative of thermal equilibrium for the belt 130. Thus it may be considered that torque communication through the belt 130 at the first torque threshold does not assist in cooling of the belt 130. Thus, in some embodiments, the monitor value is not updated (i.e. not decreased indicative of cooling) when the torque communication signal 255 is equal to the first torque threshold 410. However, in other embodiments, the monitor value may be updated when the torque communication signal 255 is equal to the first torque threshold 410. In particular, in some embodiments, the monitor value may be decreased indicative of cooling when equal.

If, in step 350, the monitor value is equal to or greater than the monitor value threshold, the method moves to step 360 wherein torque communication though the belt 130 is controlled or limited to control heating of the belt 130, as will be explained. In step 350 it is envisaged that at some times the monitor value may be negative and the monitor value zero or having a positive value in step 350. Otherwise, if the monitor value is less than the threshold, the method 300 returns to step 310.

In step 360 torque communication through the belt 130 is controlled. The torque communication through the belt 130 is controlled by the processing means 210 determining the torque limit 430. If the torque request indicated by the torque communication signal 255 is greater than the torque limit 430, then the modified torque request signal 245 output by the controller 205 is determined to be less than the received torque communication signal as shown in region 460 of FIG. 4. In FIG. 4, at time $t_2$ the monitor value reaches the monitor value threshold and the torque limit 430 is reduced. In the example, the torque limit is reduced instantaneously to the first torque threshold 410 i.e. the torque communicated through the belt 130 is reduced to that which may be communicated substantially indefinitely without excessive heating of the belt 130. However in other embodiments the torque may be reduced gradually i.e. over a period of time from the maximum torque threshold 420 to the first torque threshold (thermal equilibrium torque threshold) 410. Advantageously the reduction in the torque limit 430 over a period of time may assist in making the reduction in torque less noticeable to a driver or passenger of the vehicle. In FIG. 4, at time $t_2$ the torque communication signal 255 is less than or equal to the first torque threshold 410 and, as such, the reduction in the torque limit 430 is determined by the processing means 210 not to affect the torque communicated through the belt 130 so that the torque limit 430 may be instantaneously reduced. However if the torque communication signal 255 had been above the first torque threshold at time $t_2$ the processing means 210 may have selected to reduce the torque limit 430 gradually.

In the example, at time $t_3$ the torque communication signal 255 begins to gradually rise from a minimum value before intersecting the torque limit 430 which corresponds at that time $t_0$ the first torque threshold 410. Thus the modified torque request signal 245 is held back or restrained by the torque limit 430 in the region 460 and does not follow the torque request 255. At time $t_0$ in dependence on the monitor value the torque limit 430 is determined to be able to increase to the maximum torque limit 420. In some embodiments, the monitor value is updated whilst the modified torque request signal 245 is restrained. The recovery period 450 may be defined by a duration over which the monitor value is able to count down indicative of cooling in some embodiments, to the monitor value threshold i.e. a speed of the monitor value being updated. The speed of the updating of the monitor value may be varied, in some embodiments, in dependence on a magnitude of the torque request. For example, the speed of the updating of the monitor value may be varied to provide faster counting when the torque is relatively low, and slower updating when higher torque, or faster at higher vehicle speeds and slower at lower speeds. The processor 210 determines that, as the torque communication signal 255 is greater than the torque limit 430, thus the modified torque request signal 245 is restrained by the torque limit 430, the torque limit is to rise gradually, as indicated by 470, over a period of time from the first torque limit 410 to the maximum torque limit 430.

Figure 5:
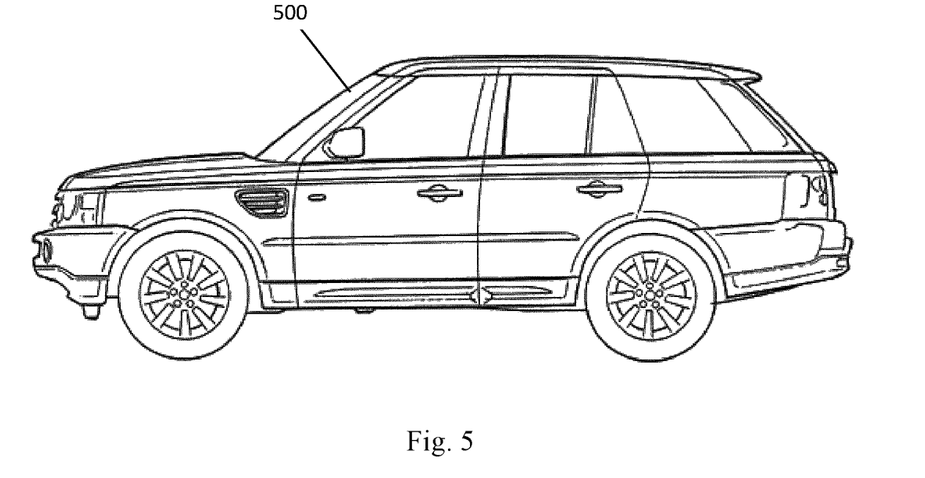
FIG. 5 shows a vehicle according to an embodiment of the invention.

FIG. 5 illustrates a vehicle 500 according to an embodiment of the invention. The vehicle 500 is a land-going vehicle according to an embodiment of the present invention. It will be appreciated that embodiments of the present invention include water-going vehicles and aircraft. The vehicle 500 is a hybrid vehicle including an ICE and an associated electric machine. The vehicle 500 may comprise a system 100 as illustrated in FIG. 1 or 2 and/or may perform a method as illustrated in FIG. 3.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A control system for an electric machine of a vehicle, the control system comprising one or more controllers, the control system comprising:
   an input arranged to receive a torque communication signal indicative of torque communication through a belt associated with the electric machine;
   one or more electronic processors arranged to dynamically determine a torque limit for the electric machine in dependence on a magnitude of the torque communication signal with respect to a first torque threshold during operation of the electric machine, determine an integral of the torque communication signal with respect to the first torque threshold, and determine the torque limit in dependence on the integral of the torque communication signal, wherein the first torque threshold is indicative of a temperature threshold for the belt; and
   an output arranged to output a torque limit signal in dependence on the torque limit to control the torque communicated through the belt associated with the electric machine.

2. The control system of claim 1, wherein the one or more electronic processors are arranged to:
   reduce the torque limit in dependence on the torque communication signal exceeding the first torque threshold; and/or
   increase the torque limit in dependence on the torque communication signal being less than the first torque threshold.

3. The control system of claim 1, wherein the one or more electronic processors are arranged to update a monitor value in dependence on the integral of the torque communication signal, wherein the torque limit is determined in dependence on the monitor value.

4. The control system of claim 3, wherein the one or more electronic processors are arranged to control the torque limit in dependence on the monitor value and a monitor value threshold.

5. The control system of claim 4, wherein the one or more electronic processors are arranged to increase or decrease the monitor value in dependence on the torque communication signal respectively exceeding or being less than the first torque threshold.

6. The control system of claim 4, wherein the one or more electronic processors are arranged to increase the monitor value at a first rate and to decrease the monitor value at a second rate.

7. The control system of claim 4, wherein the one or more electronic processors are arranged to update the monitor value in dependence on the torque communication signal being equal to the first torque threshold.

8. The control system of claim 1, wherein the one or more electronic processors are arranged to control the output to output a gradually changing torque limit signal when the torque communication signal is indicative of a greater torque than the torque limit.

9. The control system of claim 1, wherein the torque communication signal is a torque request signal indicative of a request for torque from the electric machine, and the torque limit signal is a modified torque request signal.

10. The control system of claim 1, wherein the input is arranged to receive an ambient temperature signal and the one or more electronic processors are arranged to determine the torque limit in dependence on the ambient temperature signal.

11. The control system of claim 1, wherein the input is arranged to receive a cooling signal indicative of cooling of the electric machine and the one or more electronic processors are arranged to determine the torque threshold limit in dependence on the cooling signal.

12. The control system of claim 1, wherein the one or more electronic processors are arranged to dynamically determine the torque limit for the electric machine in dependence on the torque communication signal and to control the output to output the torque limit signal in dependence on the dynamically determined torque limit.

13. A powertrain for a vehicle comprising the control system of claim 1.

14. A vehicle comprising the control system of claim 1.

15. A method of controlling an electric machine of a vehicle, comprising:
   receiving a torque communication signal indicative of torque communication through a belt associated with the electric machine;

dynamically determining a torque limit for the electric machine in dependence on a magnitude of the torque communication signal with respect to a first torque threshold during operation of the electric machine, wherein the first torque threshold is indicative of a temperature threshold for the belt; and controlling the torque communicated through the belt associated with the electric machine in dependence on the torque limit, wherein determining the torque limit comprises:
  determining an integral of the torque communication signal with respect to the first torque threshold; and
  determining the torque limit in dependence on the integral of the torque communication signal.

16. A computer product having a non-transitory, computer-readable memory storing computer software which, when executed by a computer, is arranged to perform a method according to claim 15.

17. The method of claim 15, wherein determining the torque limit comprises:
  reducing the torque limit in dependence on the torque communication signal exceeding the first torque threshold; and/or
  increasing the torque limit in dependence on the torque communication signal being less than the first torque threshold.

18. A control system for an electric machine of a vehicle, the control system comprising one or more controllers, the control system comprising:
  an input arranged to receive a torque communication signal indicative of torque communication through a belt associated with the electric machine;
  one or more electronic processors arranged to:
    determine a torque limit for the electric machine in dependence on the torque communication signal and a first torque threshold,
    determine an integral of the torque communication signal with respect to the first torque threshold, and
    determine the torque limit in dependence on the integral of the torque communication signal; and
  an output arranged to output a torque limit signal in dependence on the torque limit to control the torque communicated through the belt associated with the electric machine.

* * * * *